United States Patent [19]
Blanc et al.

[11] Patent Number: 5,976,242
[45] Date of Patent: Nov. 2, 1999

[54] SETTING-RETARDER AND ITS APPLICATION TO CONCRETE, MORTARS AND/OR GROUTS

[75] Inventors: Alain Blanc, Saint Denis; Catherine Fontaine, Chambourcy, both of France

[73] Assignee: Axim, Guerville, France

[21] Appl. No.: 08/868,724

[22] Filed: Jun. 4, 1997

Related U.S. Application Data

[62] Division of application No. 08/504,945, Jul. 20, 1995, abandoned.

[30] Foreign Application Priority Data

Jul. 20, 1994 [FR] France ................................. 94 08964

[51] Int. Cl.$^6$ ............................ C04B 24/30; C04B 24/12
[52] U.S. Cl. ........................................... 106/727; 106/808
[58] Field of Search ................................... 106/727, 808; 524/2, 6

[56] References Cited

U.S. PATENT DOCUMENTS

| | | | |
|---|---|---|---|
| 3,560,230 | 2/1971 | Previte | 106/727 |
| 3,856,541 | 12/1974 | Martin | 106/90 |
| 4,227,931 | 10/1980 | Uchikawa et al. | 106/98 |
| 4,606,770 | 8/1986 | Gerber | 106/727 |
| 4,814,012 | 3/1989 | Paul et al. | 106/38.51 |

FOREIGN PATENT DOCUMENTS

| | | |
|---|---|---|
| 221232 | 10/1981 | Czechoslovakia . |
| 0221537 | 5/1987 | European Pat. Off. . |
| 0 508 158A3 | 3/1992 | European Pat. Off. . |
| 2152234 | 3/1973 | France . |
| 1469469 | 3/1969 | Germany . |
| 1912879 | 4/1970 | Germany . |
| 1933394 | 5/1970 | Germany . |
| 2046806 | 11/1980 | United Kingdom . |
| WO86/02921 | 5/1986 | WIPO . |

OTHER PUBLICATIONS

Fred W. Billmeyer, "Chemistry of Synthetic High Polymers", Chemical Abstracts, vol. 99, Oct. 31, 1983, CA 99:141497Y.

Beck et al., "History, Education, and Documentation", Chemical Abstracts, vol. 74, Jun. 7, 1971, CA CA 74:125702Q and 74:125703.

"Chemistry of Synthetic High Polymers", Chemical Abstracts, vol. 104, No. 20, May 19, 1986, CA 104:173369W.

Bojadjieva et al., "Investigation of the Influence of Some Plasticizers of Gypsum–Free Cement Paste," 1995, pp. 685–689.

Chemical Abstracts No. 125703r, vol. 74, No. 23, Jun. 7, 1971, US, p. 478.

Bojadjieva et al., Cement and Concrete Research, vol. 25,No. 4pp. 685–688, 1995.

*Primary Examiner*—Jeffrey C. Mullis
*Attorney, Agent, or Firm*—Nixon & Vanderhye, P.C.

[57] ABSTRACT

A hydraulic-cement setting retarder included in concrete, mortars, or grouts to control setting time as a function of the retarder dosage. Specifically, the retarder is a cyclic amino resin of formula (I):

$$\begin{array}{c} R_4O \quad\quad OR_3 \\ | \quad\quad\quad | \\ CH\text{——}CH \\ / \quad\quad\quad \backslash \\ R_1\text{—}N \quad\quad N\text{—}R_2 \\ \backslash \quad / \\ C \\ \| \\ O \end{array} \quad (I)$$

where
(a) R1 is a hydrogen atom, a hydroxymethal radial or a group of formula (II)

$$CH_2\text{—}O\text{—}R \quad (II)$$

(b) $R_2$ is a group of formula (II),
(c) R is a linear or branched C1–C4 alkyl radical, or a group of formula (III)

$$\left[\text{——}(CH_2)_n\text{—}\underset{\underset{R''}{|}}{\overset{\overset{R'}{|}}{C}}\text{—}CHR'''\text{——}O\text{——}\right]_m\text{H}$$

(d) $R_3$ and $R_4$ each are a hydrogen atom, and C1–C4 linear or branched alkyl radical or a group of formula (III).

15 Claims, No Drawings

SETTING-RETARDER AND ITS APPLICATION TO CONCRETE, MORTARS AND/OR GROUTS

This application is a division of application Ser. No. 08/504,945 filed Jul. 20, 1995, now abandoned.

The present invention relates to a setting retarder and to its applications to concrete, mortars and/or grouts.

It must be borne in mind that a setting retarder not only retards the onset of setting but also may affect the setting time-interval between setting onset and setting end.

For many reasons, the expert wishes to control the setting time of concrete, mortars and/or grouts in order to improve workability.

It is known to use hydroxylated derivatives such as gluconic acid and its salts, the lignosulfonic acids and their salts, hydroxyacetic acid and its salts, dimethylurea, tetramethyl-glycoluril, dimethylol 1-3 dihydroxy 4-5 imidazolidinone 2 (DMDHeu) as hydraulic-cement setting retarders, said derivatives used as setting retarders being described in the U.S. Pat. Nos. 3,560,230; 4,606,770 and also in the French patent 2,152,234; furthermore the European patent application 0,508,158 describes the use of phosphonoalkane tricarboxylic acids and their salts when used as cement-setting retarders.

The above products incur the drawback that they degrade the physical concrete properties, in particular their compressive strength, or that they increase the time between the onset and the end of concrete, mortars and/or grout setting. This increase in setting time and the interval between the beginning and end of setting of concrete, mortars and/or grout is large for small proportions, entailing delicate workability: for dosages double of normal, setting delays of several days have been observed.

The object of the invention is a hydraulic-cement setting retarder which allows perfect control of the setting time as a function of the retarder dosages.

The originality of the invention is the fact that the cyclic amino resins are incorporated into concrete, mortars or grouts, the setting delay observed being less affected by dosage and being more or less pronounced depending on the kind of resin used.

The object of the invention is a hydraulic-cement setting retarder characterized in that it is composed of a cyclic amino resin of formula I:

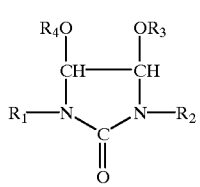

(I)

where (a) $R_1$ is a hydrogen atom, a hydroxymethyl radical or a group of formula II $$—CH_2—O—R \qquad (II)$$

(b) $R_2$ is a group of formula II,
(c) R in formula II is C1–C4 branched or linear alkyl radical or a group of formula III,

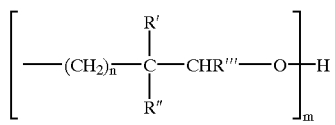

(d) $R_3$ and $R_4$ are either identical or different and each represents a hydrogen atom, C1–C4, linear or branched alkyl radical or a group of formula III in their different stereoisomeric forms, that is, depending on their cis and trans isomers and/or their mixture in various proportions.

R', R", R''' of formula III are either identical or indifferent and represent a hydrogen atom or a C1–C4 branched or linear alkyl radical, n is 0 or 1 and m is 1, 2, 3 or 4.

The C1–C4 alkyl radical denotes a methyl, ethyl, n-propyl or n-butyl radical.

The invention is further characterized by the following features:

R in formula II is a methyl-, ethyl-, n-propyl-, isopropyl-, n-butyl or isobutyl-radical; a 2 hydroxy ethyl, 2 hydroxypropyl, or 2-(2-hydroxy ethoxy) ethyl or 11-hydroxy-3,6,9-trioxa-undecanoyl group in their different stereoisomeric forms.

The cyclic amino resin of formula I is taken from the group of:
1-hydroxymethyl-3-methoxymethyl-4,5-dihydroxy-2-imidazolidinone, cis and/or trans,
bis-1,3-methoxymethyl-4,5-dihydroxy-2-imidazolidinone, cis and/or trans,
1-hydroxymethyl-3-(2-hydroxy-ethoxymethyl)-4,5-dihydroxy-2-imidazolidinone, cis and/or trans,
bis-1,3-(2-hydroxy-ethoxymethyl)-4,5-dihydroxy-2-imidazolidinone, cis and/or trans,
1-hydroxymethyl-2-(hydroxy-2 ethoxy)-3-ethoxymethyl-4,5-dihydroxy-2-imidazolidinone, cis and/or trans,
bis-1,3-[2-(2 hydroxyethoxy)ethoxymethyl]-4,5-dihydroxy-2-imidazolidinone, cis and/or trans,
1-hydroxymethyl-3-(11-hydroxy-3,6,9-trioxa-undecanoyloxymethyl)-4,5-dihydroxy-2-imidazolidinone, cis and/or trans,
bis-1,3-(11-hydroxy-3,6,9-trioxa-undecanoyloxymethyl)-4,5-dihydroxy-2-imidazolidinone, cis and/or trans.

The cyclic amino resins of formula I are either commercially available products or known products or products which can be made by known methods such as partial or total methylolation of dihydroxyethylene-urea followed by partial or total alkylation of the hydroxyl groups by ROH or R alcohols as defined above.

The ROH alcohols in particular include methanol, ethanol, propanol-1, butanol-1, ethylene glycol, propanediol 1, 2, diethylene glycol, triethylene glycol, neopentyl glycol, tetraethylene glycol.

Moreover, denoting glyoxal by G, urea by U, formaldehyde by F and the ROH formula alcohol by A, the cyclic amino resins of formula I can be defined by the molar ratios of glyoxal, formaldehyde and A alcohol that were employed to prepare them.

In particular the products of formula I include those for which, when the molar ratio G/U is 1, the molar ratio F/U is between 1.5 and 2 and the molar ratio A/U is between 0.5 and 2.

The cyclic amino resins of formula I are conventionally prepared in aqueous solution starting with commercial aqueous glyoxal solutions. Condensation between urea and glyoxal as a rule is carried out at a pH between 6 and 8 and at a temperature between 50 and 70° C. Methylolation generally is carried out by introducing an aqueous formaldehyde solution into the ureaglyoxal condensation medium and the hydroxyl groups generally are alkylated in the corresponding alcohol reaction medium and by adjusting the pH to a value less than 3 (KIRK-OTHMER Encyclopedia of Chemical Technology, $3^{rd}$ ed. Vol. 22, pp. 769–803, 1983, Wiley & Sons, NY).

Lastly in a variation of the invention, the cyclic amino resins of formula I may be either mixed with or complexed by a boron derivative selected from the group composed of boric acid and its salts of alkaline metals and alkaline-earth metals and sodium tetraborate.

Preferably 0.1 to 1 mole of boric acid or one of its salts of alkaline or earth-alkaline metals or of 0.025 to 0.25 moles of sodium tetraborate per mole of urea present in the resin are incorporated into the amino resins of formula I.

The amino resins of formula I are applicable at doses of 0.001 to 5% and preferably of 0.01 to 1%.

In their various stereoisomeric forms, the above cyclic amino resins I as well as those containing a boron derivative selected from the group composed of boric acid and its salts of alkaline and earth-alkaline metals and sodium tetraborate evince significant properties of retardation for the setting of hydraulic cements without however thereby entailing substantial degradation of the physical properties (in particular the compression strength) of concrete, mortars and grouts.

The retarders of the invention, when used with super-plasticizers such as sulfonated polynaphthalenes, sulfonated poly-melamines for instance and without implying restriction, will conserve their properties and will not modify those of the super-plasticizers.

These properties justify the use of cyclic amino resins of formula I in their different stereoisomeric forms as hydraulic-cement setting retarders in the manufacture of concrete, mortars and grouts.

In particular, these compounds are significant in that they are fairly insensitive to dosage dispersion, contrary to the case of powerful setting retarders such as the gluconates or DMDHEU.

The attached Tables and graphs show the test results proving the characteristics imparted by the amino resins I to concrete, mortar and/or grout.

Table 1 lists different setting retarders tested under the invention by using:

G=glyoxal
F=formaldehyde
U=urea
A=alcohol
DEG=diethylene glycol
MEOH=methanol.
A1=DEG/MEOH mixture in molar proportions of 53/47.
The ratios G/U; F/U; A/U and B/U are molar.

Table 2, graph 1 shows the first test series, demonstrating the effect of dosage (active product) on the onset and end of setting of CPA 55 cement (made by Gaurain) which is the reference cement used by AFNOR when testing admixtures).

Table 3 shows the second test series, demonstrating the absence of toxicity of the cyclic amino resins I by comparing the test results of controls without admixtures and those of setting retarders such as defined on Table I.

W/C is the water/cement ratio; Rc and Rf are the compression and bending strengths.

Tables 4, 5 and 6 show the third test series.

Table 4 shows the performance of mixtures containing a super-plasticizer (PNS=sulfonated polynaphthalene) and a setting retarder such as gluconate and 1, 3, 4; the mixture is dosed at 0.8% in a mortar based on a CPA HP cement (Cormeilles), which is the reference cement selected by AFNOR for super-plasticizer tests.

The composition of the tested mixture is:

polynaphthalene=27%; retarder=2%; water=71%.

The mixture dosage is 0.8% and hence the retarder dosage is 0.016% by weight of cement.

Table 5 demonstrates the effect of increasing the dosage in the PNS/retarder mixture on the setting time of mortar based on CPA HP (Cormeilles).

The mixture compositions is: PNS=27%; retarder=2%; water=71%.

Table 6 proves the effect of dosage of the PNS/retarder mixture on maintaining rheology.

The tests were run according to the following standards:

NF-EN 196-1 for mechanical strength,

NF-P18 356-3 for setting time.

In the first series of tests (Table 2, graph 1), there is a decrease in the retarding effect in setting at equivalent dosage.

In the first series of tests (Table 2, graph 1), it is made clear that compared with conventional retarders, the retarders of the invention when equivalently dosed will retard less while essentially preserving the time interval between the onset and the end of setting.

In the second series of tests (Table 3), the mortar compressive strengths after 8 and 29 days are equivalent to or slightly less than those resulting with using a conventional gluconate retarder used to-date.

In the third series of tests, Table 4 shows that the mixtures PNS/gluconate and PNS/1, 2, 3 allowing maintaining the rheology; the Flowtest spreading remains identical over a 1-hr interval. Moreover, there is a delay in the setting of the mixture with 1, 3 and 4 relative to the mixture without retarder, and also there is a lesser time interval between the onset and end of setting for the mixture containing 1, 3, 4 than for the mixture containing gluconate. These features are significant to the expert because they allow earlier concrete mold-removal.

The test results for compressive strength for 1, 3 and 4 are equivalent to or better than when gluconate is present.

Table 5 shows the compounds 1, 3 and 4 entail a lesser setting delay than gluconate when the mixture dosages are 4%; this is proof these products can be used at high dosages while retaining short-term strength.

Table 6 shows that for a 0.8% dosage, the mixtures of PNS and conventional retarder or with a retarder of the invention are substantially equivalent. Be it noted however that a 4% dosage, the gluconate-based mixture is slightly more fluid. But the rheology loss between To and 60' is the same, regardless of which retarder is used.

TABLE 1

|  | 1 | 2 | 3 | 4 | 5 | 6 |
|---|---|---|---|---|---|---|
| G/U | 1 | 1 | 1 | 1 | 1 | 1 |
| F/U | 1.5 | 1.5 | 1.5 | 1.5 | 1.5 | 2 |
| A/U | 0.7 | 0.7 | 1.2 | 1.2 | 1.5 | 0.66 |
| A | DEG | DEG | DEG | DEG | $A_1$ | MeOH |
| B/U |  | 0.5 |  | 0.5 |  |  |

TABLE 2

| Active ingredient dosage | GI | | DMDHEU | | 1 | | 3 | |
|---|---|---|---|---|---|---|---|---|
| (%) | DP | FP | DP | FP | DP | FP | DP | FP |
| 0 | 4 h 30' | 7 h 30' | 4 h 30' | 7 h 30' | 4 h 30' | 7 h 30' | 4 h 30' | 7 h 30' |
| 0.06 | / | / | / | / | / | / | / | / |
| 0.0672 | / | / | 10 h 10' | 12 h 25' | / | / | / | / |
| 0.069 | / | / | / | / | 7 h 30' | 10 h 30' | 6 h 30' | 9 h 00' |
| 0.0693 | / | / | / | / | / | / | / | / |
| 0.095 | 13 h 20' | 16 h 30' | / | / | / | / | / | / |
| 0.12 | / | / | / | / | / | / | / | / |
| 0.135 | >24 h | / | >24 h | / | / | / | / | / |
| 0.137 | / | / | / | / | / | / | 10 h 30' | 13 h 00' |
| 0.138 | / | / | / | / | 15 h 30' | 18 h 00' | / | / |
| 0.139 | / | / | / | / | / | / | / | / |
| 0.18 | / | / | / | / | / | / | / | / |
| 0.202 | / | / | / | / | / | / | / | / |
| 0.207 | / | / | / | / | 22 h 00' | 23 h 30' | / | / |
| 0.208 | / | / | / | / | / | / | 15 h 50' | 17 h 35' |
| 0.209 | / | / | / | / | / | / | / | / |

| Active ingredient dosage | 4 | | 5 | | 6 | |
|---|---|---|---|---|---|---|
| (%) | DP | FP | DP | FP | DP | FP |
| 0 | 4 h 30' | 7 h 30' | 4 h 30' | 7 h 30' | 4 h 30' | 7 h 30' |
| 0.06 | 5 h 40' | 8 h 20' | / | / | / | / |
| 0.0672 | / | / | / | / | 5 h 00' | 8 h 35' |
| 0.069 | / | / | / | / | / | / |
| 0.0693 | / | / | 6 h 40' | 10 h 00' | / | / |
| 0.095 | / | / | / | / | / | / |
| 0.12 | 7 h 45' | 10 h 55' | / | / | / | / |
| 0.135 | / | / | / | / | 5 h 45' | 8 h 55' |
| 0.137 | / | / | / | / | / | / |
| 0.138 | / | / | / | / | / | / |
| 0.139 | / | / | 11 h 05' | 12 h 50' | / | / |
| 0.18 | / | / | / | / | / | / |
| 0.202 | / | / | / | / | 8 h 30' | 11 h 30' |
| 0.207 | 11 h 00' | 13 h 00' | 19 h 05' | 21 h 45' | / | / |
| 0.208 | / | / | / | / | / | / |
| 0.209 | / | / | / | / | / | / |

TABLE 3

| | Control without admixture | G | 1 | 3 | 4 | 5 |
|---|---|---|---|---|---|---|
| Active ingredient dosage (%) | / | 0.095 | 0.138 | 0.137 | 0.12 | 0.139 |
| W/C (g/cm²) | 0.5 | 0.5 | 0.5 | 0.5 | 0.5 | 0.5 |
| RC 8 days (MPa) | 51.0 | 46.1 | 49.3 | 47.2 | 43.7 | 42.7 |
| RC 29 days (Mpa) | 63.3 | 62.7 | 62.0 | 60.0 | 56.6 | 55.4 |

TABLE 4

| | SETTING | | RC (MPa) | | | | FLOW TEST (10-fold) | | |
|---|---|---|---|---|---|---|---|---|---|
| RETARDER | DP | FP | 1 day | 7 days | 28 days | 90 days | $T_o$ | +30' | +60' |
| without admixture | 4 h 50' | 7 h 50' | 20.7 | 57.1 | 73.8 | 79.5 | / | / | / |
| G | 6 h 20' | 8 h 35' | 20.6 (100%) | 56.7 (99%) | 72.7 (%) | 79.9 (100%) | 210 | 185 | 175 |
| 1 | 5 h 40' | 7 h 40' | 24.0 (100%) | 59.0 (103%) | 77.5 (105%) | 82.1 (103%) | 205 | 185 | 170 |
| 3 | 5 h 10' | 7 h 35' | 18.8 (91%) | 56.7 (99%) | 72.4 (98%) | 79.2 (99.6%) | 210 | 185 | 170 |
| 4 | 5 h 30' | 7 h 30' | 19.8 (96%) | 57.8 (101%) | 73.8 (100%) | 80.0 (100.6%) | 210 | 180 | 170 |

TABLE 5

| Water/cement | Dosage (% by wt of cement) | G DP | G FP | 1 DP | 1 FP | 3 DP | 3 FP | 4 DP | 4 FP |
|---|---|---|---|---|---|---|---|---|---|
| 0.5 | 0.8 | 6 h 20' | 8 h 35' | 5 h 40' | 7 h 40' | 5 h 10' | 7 h 35' | 5 h 30' | 7 h 30' |
| 0.40 | 0.2 | 10 h 30' | 13 h 00' | 10 h 20' | 12 h 35' | 8 h 45' | 10 h 00' | 7 h 45' | 9 h 35' |
| 0.38 | 4.0 | >60 h 00' | / | 45 h 00' | / | 45 h 00' | / | 30 h 00' | / |

TABLE 6

| Mixture dosage (PNS/retarder) in % | water/ cement | retarder | Flow test (10 runs) $T_0$ | +30' | +60' | +90' |
|---|---|---|---|---|---|---|
| 0.8 | 0.5 | G | 210 | 185 | 175 | / |
| | | 1 | 205 | 185 | 170 | / |
| | | 3 | 210 | 185 | 170 | / |
| | | 4 | 210 | 180 | 170 | / |
| 4.0 | 0.38 | G | 190 | 185 | 180 | 175 |
| | | 1 | 180 | 170 | 165 | 160 |
| | | 3 | 180 | 170 | 165 | 160 |
| | | 4 | 180 | 175 | 170 | 165 |

We claim:

1. A cement composition comprising a settable hydraulic cement in combination with an effective amount to retard setting of the cement of at least one cyclic-amino resin of formula (I)

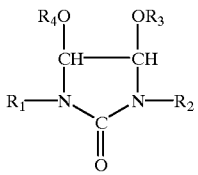
(I)

wherein (a) $R_1$ is a hydrogen atom, a hydroxymethyl radical, a 11-hydroxy-3,6,9-trioxa-undecanoyl oxymethyl radical or a group of the formula (II)

$$CH_2-O-R \quad (II)$$

(b) $R_2$ is a 11-hydroxyl-3,6,9-trioxa-undecanoyl oxymethyl radical or a group of formula (II), wherein (c) R is a linear or branched $C_1-C_4$ alkyl radical, or a group of formula (III)

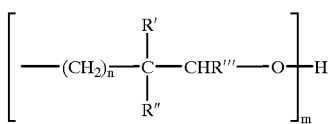
(III)

(d) where $R_3$ and $R_4$ each are a hydrogen atom, a $C_1-C_4$ linear or branched alkyl radical or a group of formula (III), and R', R" and R'" each represent a hydrogen atom, a $C_1-C_4$ linear or branched alkyl radical, n is 0 or 1 and m is 1, 2, 3, or 4.

2. A cement composition according to claim 1, wherein $R_3$ and $R_4$ are identical.

3. A cement composition according to claim 1, wherein R', R", R'" are identical.

4. A cement composition according to claim 1, wherein the $C_1-C_4$ linear or branched alkyl radical denotes a methyl-, ethyl-, n-propyl-, isopropyl, n-butyl or isobutyl-radical.

5. A cement composition according to claim 1, wherein R is methyl-, ethyl-, n-propyl-, n-butyl-, isopropyl-, isobutyl-, 2-hydroxyethyl, 2-hydroxypropyl, 2-(2-hydroxyethoxy) ethyl, or 11-hydroxy-3,6,9-trioxa-undecanoyl-radical including their different stereoisomeric forms.

6. A cement composition according to claim 1, wherein the cyclic amino resins of formula (I) are selected from the groups:

a) bis1,3-methoxymethyl-4,5-dihydroxy-2-imidazolidinone;

b) 1-hydroxymethyl-3(2-hydroxyethoxymethyl)-4,5-dihydroxy-2-imidazolidinone;

c) bis1,3-(2-hydroxyethoxymethyl)-4,5-dihydroxy-2-imidazolidinone;

d) 1-hydroxymethyl-3-2-(2-hydroxyethoxy) ethoxymethyl-4,5-dihydroxy-2-imidazolidinone;

e) bis1,3-2-(2-hydroxyethoxy)ethoxymethyl)-4,5-dihydroxy-2-imidazolidinone;

f) 1-hydroxymethyl-3(11-hydroxy-3,6,9-trioxa-undecanoyl oxymethyl)-4,5-dihydroxy-2-imidazolidinone; and g) bis1,3-(11-hydroxy-3,6,9-trioxa-undecanoyloxymethyl)-4,5-dihydroxy-2-imidazolidinone.

7. A cement composition according to claim 6, wherein the cyclic amino resins of formula I are trans isomers.

8. A cement composition according to claim 6, wherein the cyclic amino resins of formula I are cis isomers.

9. A cement composition according to claim 1, wherein the cyclic amino resins of formula (I) are defined by the molar ratios of glyoxal (G), formaldehyde (F) and ROH alcohol (A) or urea (U) such at if G/U=1, then 1.5>F/U>2 and 0.5<0.5<A/U<2.

10. A cement composition according to claim 1, wherein the cyclic amino resins of formula (II) are either mixed with or complexed by a boron derivative selected from the group consisting of boric acid and sodium tetraborate.

11. The cement composition of claim 10, wherein the cyclic amino resins of formula (II) are either mixed with or complexed by a member selected from the group consisting of boric acid, an alkali metal salt thereof, and an alkaline earth metal salt thereof, wherein 0.025 to 0.25 moles of said member per mole of urea is present in the resin.

12. The cement composition of claim 1, wherein the amino resins of formula (I) are used to retard the setting of the hydraulic-cement in amounts of about 0.001 to 5%.

13. The cement composition of claim 1, wherein the cement is a concrete mortar or grout.

14. A method according to claim 13, wherein said effective amount comprises about 0.001 to about 5% by weight, based on the cement.

15. A method for retarding the setting of a hydraulic cement which comprises adding to said cement an effective amount of a setting retarder comprising a cyclic-amino resin of formula I:

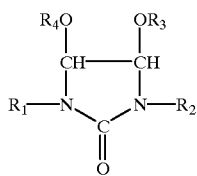

wherein
(a) $R_1$ is a hydrogen atom, a hydroxymethyl radical, a 11-hydroxy-3,6,9-trioxa-undecanoyl oxymethyl radical or a group of the formula (II)

$$—CH_2—O—R \qquad (II)$$

(b) $R_2$ is a 11-hydroxyl-3,6,9-trioxa-undecanoyl oxymethyl radical or a group of formula (II), wherein (c) R is a linear or branched $C_1$–$C_4$ alkyl radical, or a group of formula (III)

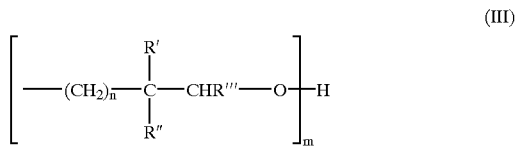

(d) where $R_3$ and $R_4$ each are a hydrogen atom, a $C_1$–$C_4$ linear or branched alkyl radical or a group of formula (III), and R', R" and R'" each represent a hydrogen atom, a $C_1$–$C_4$ linear or branched alkyl radical, n is 0 or 1 and m is 1, 2, 3, or 4.

* * * * *